United States Patent [19]
Melchior et al.

[11] Patent Number: 6,116,788
[45] Date of Patent: Sep. 12, 2000

[54] OPTICAL PLUG CONNECTOR

[75] Inventors: Lutz Melchior; Jörg-Reinhardt Kropp, both of Berlin, Germany

[73] Assignee: Siemens Aktiengesellschaft, Munich, Germany

[21] Appl. No.: 09/059,100

[22] Filed: Apr. 13, 1998

Related U.S. Application Data

[63] Continuation of application No. PCT/DE96/01972, Oct. 11, 1996.

[51] Int. Cl.[7] .................................................. G02B 6/38
[52] U.S. Cl. .............................. 385/59; 385/71; 385/77
[58] Field of Search .................................. 385/77, 78, 81, 385/59, 60, 62, 71, 53, 89

[56] References Cited

U.S. PATENT DOCUMENTS

| | | |
|---|---|---|
| 4,986,762 | 1/1991 | Keith . |
| 5,555,332 | 9/1996 | Dean et al. ............................... 385/59 |
| 5,600,747 | 2/1997 | Yamakawa et al. ...................... 385/59 |
| 5,689,598 | 11/1997 | Dean, Jr. et al. ......................... 385/59 |
| 5,971,624 | 10/1999 | Giebel et al. ............................. 385/59 |

FOREIGN PATENT DOCUMENTS

| | | |
|---|---|---|
| 0156397A2 | 10/1985 | European Pat. Off. . |
| 0330231A2 | 8/1989 | European Pat. Off. . |
| 0430107A2 | 6/1991 | European Pat. Off. . |
| 0546936A1 | 6/1993 | European Pat. Off. . |
| 0485196B1 | 12/1994 | European Pat. Off. . |
| 7-77638 | 3/1995 | Japan . |

OTHER PUBLICATIONS

International Application No. 94/24594 (Hultermans), dated Oct. 27, 1994.

*Primary Examiner*—Hemang Sanghavi
*Attorney, Agent, or Firm*—Herbert L. Lerner; Laurence A. Greenberg; Werner H. Stemer

[57] ABSTRACT

The plug connector can be plugged into a coupling element. The connector has a holder in which at least one optical wave guide plug is mounted so as to be axially displaceable counter to a spring force. The holder is inserted into a carrier element. Elements are provided which allow the holder to be fixed in at least two different discrete axial positions relative to the carrier element. The elements are positively engaging contours formed on the holder and the carrier element. The different discrete positions enable easy and simple adaptation of the configuration to different plug-in depths.

11 Claims, 3 Drawing Sheets

OPTICAL PLUG CONNECTOR

CROSS-REFERENCE TO RELATED APPLICATION

This application is a continuation of copending international application Ser. No. PCT/DE96/01972, filed Oct. 11, 1996, which designated the United States.

BACKGROUND OF THE INVENTION

1. Field of the Invention

The invention relates to optical plug connectors, in particular for modular electronic devices. Such devices usually have a plurality of printed circuit board plug-in units which are aligned essentially in parallel and are supported by a common motherboard or a so-called backplane. The printed circuit board plug-in units are provided with multiple plug connectors to lead them through the walls and to connect to other printed circuit board plug-in units. Corresponding connection partners are arranged on the rear of the backplane which may be plug connectors of similar design and which can be plugged into an intermediate component arranged in the rear wall, thereby aligning the connection partners.

The invention relates to an optical plug connector which is suitable for this purpose and which, with an attendant alignment of at least one optical wave guide plug, can be inserted into a connecting element, having a holder in which the optical wave guide plug is mounted so as to be axially displaceable counter to the force of a spring element.

Optical connections make extremely high demands in terms of the reproducibility and precision of their efficiency of connection. In contrast to purely electrical plug-type connections, in the case of optical plug-type connections a defined plug-in depth or plug-indepth of the plug connectors and/or a direct physical contact between the connecting end faces of the optical wave guide plugs with the respective connection partner is required. In this context, diverse designs have become known in which a spring force exerts a defined contact pressure between the end faces of the connection partners.

2. Description of the Related Art

International publication WO 94/24594 describes a single-duct optical wall bushing in which two optical wave guide plugs which are mounted so as to be axially displaceable counter to a spring force, each in a plug connector, can be inserted into a centering sleeve of a connection element which penetrates the wall. Locking elements of the connection element engage directly on the holder when the plug connector is inserted and can be unlocked as required by means of an axially displaceable unlocking sleeve (push-pull principle) surrounding the holder.

European patent application EP-0 330 231 A2 describes a wall bushing with two plug connectors each in the form of a hybrid or multipoint connector which has optical and electrical plug pins in addition to centering elements.

A plug connector of the type described above has become known heretofore from European patent EP-0 485 196 B1. There, a connection element penetrates a wall and a plug connector is insertible into the connection element on each side. Each plug connector comprises an optical wave guide plug (so-called multiple fiber ferrule) which receives a plurality of optical wave guide ends arranged in one plane. The optical wave guide plugs can be aligned with respect to one another by means of corresponding centering ducts in the connection element, the optical wave guide plugs which can be pushed back axially counter to the force of a spring element coming into physical contact with the connecting end faces.

The aforethe known plug connectors share the common problem that the maximum plug-in depth of the optical wave guide plugs is defined by the prescribed available spring compression travel of the optical wave guide plug and the stop or locked position of the plug connector is defined. The configuration of the plug connectors must be precisely matched in advance to the respective plug-in depth or wall thickness, because otherwise the desired physical contact between the connecting end faces may not (or no longer) come about.

SUMMARY OF THE INVENTION

It is accordingly an object of the invention to provide an optical plug connector, which overcomes the above-mentioned disadvantages of the prior art devices and methods of this general type and with which different plug-in depths can be implemented while the structure remains unchanged in terms of the available travel of the axial displacement and the length of the plug pin, with the result that, for example, use with different wall thicknesses is possible.

With the foregoing and other objects in view there is provided, in accordance with the invention, an optical plug connector for insertion into a coupling element and optical alignment of an optical wave guide plug, comprising:

a holder having an optical wave guide plug axially displaceably mounted therein against an axial spring force (e.g. a spring element);

a carrier element receiving and housing the holder, the carrier element having elements for fixing a position thereof relative to a coupling element into which the optical plug connector is insertible;

the holder and the carrier element being formed with positively engaging contours defining and securing at least two different discrete positions in an axial direction of the holder relative to the carrier element.

In other words, the objects of the invention are satisfied in that a holder is inserted into a carrier element which is provided with means for securing the relative position with respect to the connection element, and in that the holder and the carrier element have positively engaging contours which are designed in such a way that the position of the holder with respect to the carrier element can be set and secured in at least two different discrete positions in the axial direction.

The holder and the carrier element can be secured in relation to one another, by means of positively engaging elements which interact with one another and which are formed by corresponding external and internal contours. The positions of the contour element in different relative axial positions can be selected as required. In this way, the amount by which the holder projects beyond the carrier element which is positioned with respect to the connection element or the wall in a prescribed way by means of the position securing means can advantageously be set. At the same time, the penetration depth of the optical wave guide plugs into the connection element is thus determined. Preferably, the carrier element has, as position securing means, locking levers which interact with corresponding locking elements on the wall or connection element. The plug connector according to the invention can be used particularly advantageously for the wall bushing with a wide variety of wall thicknesses or backplane thicknesses and can also readily be adapted thereto on site and when making modifications.

In accordance with an added feature of the invention, the carrier element is formed with an opening in a wall thereof, and the holder is insertible into the carrier element through the opening.

In accordance with an additional feature of the invention, the positively engaging contours include an external toothing with a given pitch spacing formed on the holder and a mating internal toothing with the given pitch spacing formed on the carrier element. This embodiment of the invention is advantageous. The interacting, positively engaging ratchet teeth enable the holder to be secured with respect to the carrier element in a plurality of discrete relative axial positions. The plug-in depth, for example, for a wall bushing, can thereby be adapted in fine gradation in steps which correspond to the toothing pitch.

In accordance with another feature of the invention, the holder is formed with a plurality of chambers each containing an optical wave guide plug in a floating spring-loaded position. Further, each of the optical wave guide plugs may terminate a plurality of optical wave guides. This embodiment is quite preferable in terms of connecting a large number of optical channels. The several individual optical wave guide plug are supported in a floating, spring force-loaded fashion and, preferably, each optical wave guide plug terminates a plurality of optical wave guides. The optical wave guide plugs used here may be so-called "multi-fiber ferrules" which are known from the prior art and which carry a plurality of optical wave guide ends in a common plastic plug. Such optical wave guide plugs are disclosed, for instance, in the above-noted European patent EP-0 485 196 B1 and the Japanese application JP-07-77638 A1.

In accordance with a further feature of the invention, the holder is formed with a collar at a forward end thereof in a plug-in direction, the collar projecting beyond end faces of the optical wave guide plugs. The sensitive connection end faces of the optical wave guide plugs are thus protected against damage in the unplugged state in that the collar projects over the end face or faces of the optical wave guide plug or plugs.

In accordance with a concomitant feature of the invention, the holder is formed with receptacle chambers at a rear thereof relative to a plug-in direction, and there are provided tensile relief elements and/or anti-buckling elements at least in the receptacle chambers.

Other features which are considered as characteristic for the invention are set forth in the appended claims.

Although the invention is illustrated and described herein as embodied in an optical plug connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
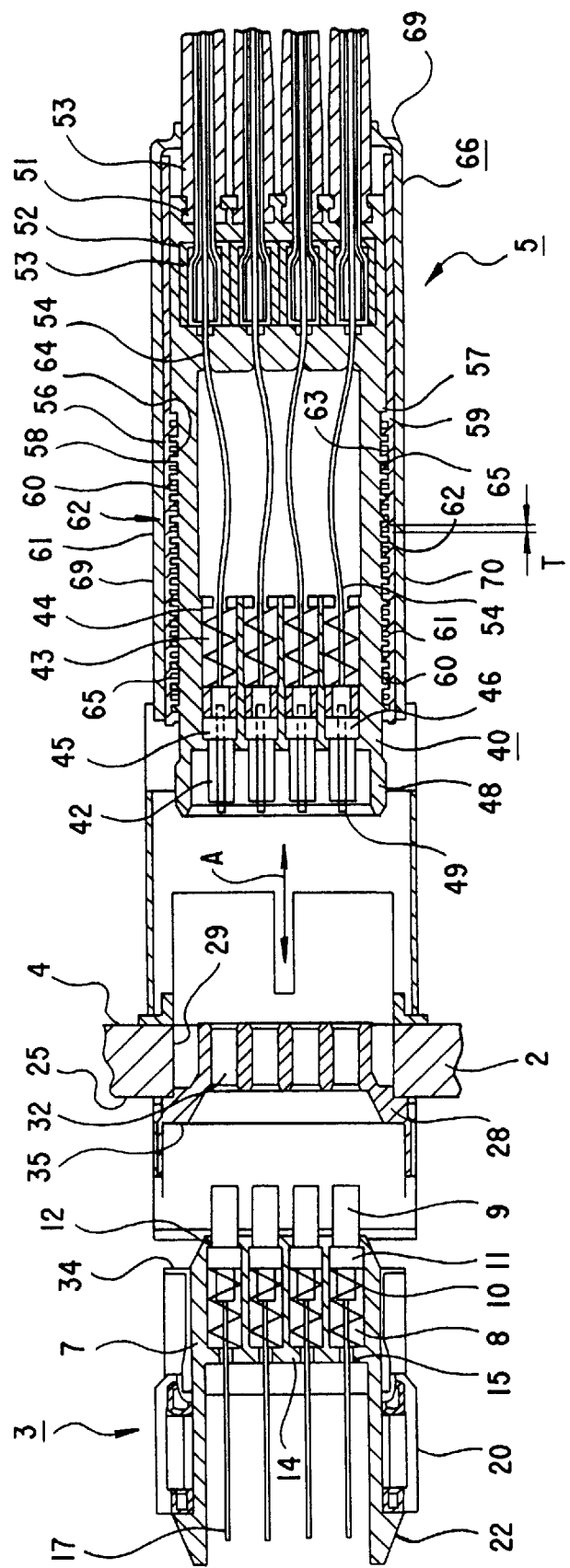
FIGS. 1 and 2 are longitudinal sectional views of a plug connector according to the invention.
Figure 2:
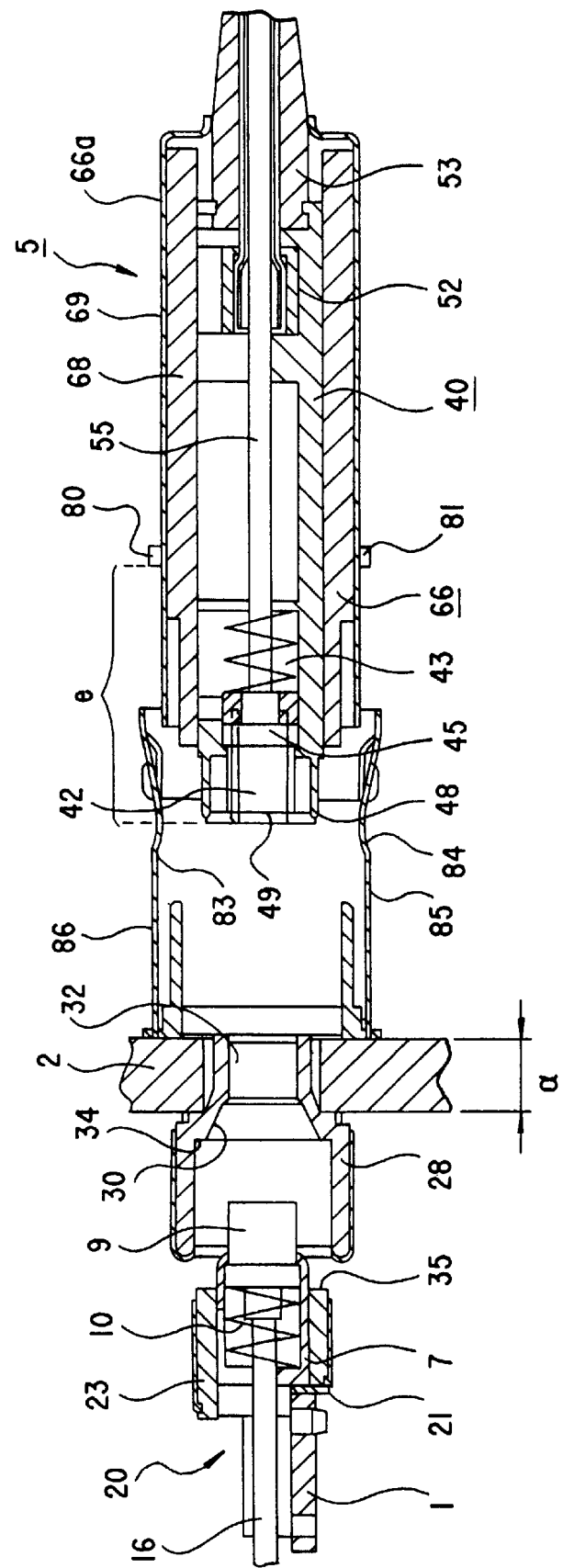

Referring now to the figures of the drawing in detail and first, particularly, to FIGS. 1 and 2 thereof, there is seen a detail of an electronic device with a wall bushing for optical channels. A printed circuit board module 1 is arranged, together with non-illustrated further printed circuit board modules in parallel and at right-angles to a so-called backplane 2 in a rack cabinet. A first plug connector 3 is provided on the printed circuit board module 1, both to connect the module 2 mechanically to the rear wall 2 and to be able to conduct electrical and optical signals from the module to and/or through the backplane 2. A second plug connector 5 which can be inserted from the rear 4 of the wall 2 transmits the signals to other modules of the rack cabinet or conducts the signals to other rack cabinets.

In the exemplary embodiment of the wall bushing, the plug connector 3 comprises a holder 7 with four chambers 8. Four optical wave guide plugs 9 are mounted floating in parallel one next to the other in said chambers 8. The optical wave guide plugs 9 which are formed as so-called multi-fiber ferrules (cf. EP 0 485 196 B1) made of plastic are axially displaceable (in direction A) in the chambers 8 counter to the force of individual helical coil springs 10. An axial freedom of movement of the ferrules is limited in each case by the stop of a shoulder 11 on end-side of constrictions 12 and at the rear by a holder wall 14 with through-openings 15 for the optical wave guide ends 17 which are combined in optical wave guide bands 16. On the printed circuit board module 1 there is a strip connector 20 for receiving the holder 7. The holder is inserted into the strip connector 20 from the front which is open at the coupling end, is centered by means of guide elements and is pressed against a stop 21. Latching hooks 22 latch behind the strip connector 20.

When the holder 7 is inserted into the strip connector 20, the chambers 8 are closed off by a cover 23 of the strip connector 20 to such an extent that the optical wave guide plugs 9 and the springs 10 cannot be removed from the chambers 8 when they are being handled and/or during plug-in operations. The strip connector 20 is capable of receiving not only the holder 7 but also electric contact elements so that so-called mixed strip connectors can be configured.

The optical wave guide plugs 9 of the plug connector 3 can be inserted from the inside 25 of the wall into a coupling element 28 which penetrates an opening 29 in the wall 2. The contour 30 on the inside of the wall of the coupling element 28 is shaped in such a way that when the plug connector 3 is inserted the contours of the respective components are centered in stages. Finally, the optical wave guide plugs 9 are simultaneously centered in centering ducts 32 which are adapted to their geometry and have a rectangular cross section. When the plug connector 3 is inserted completely, the end face 34 of the strip connector 20 strikes against a stop face 35 of the coupling element 28 and in this way determines the plug-in depth of the plugs 9. The coupling element 28 can additionally receive all electrical contacts.

The plug connector 5 which can be inserted at the rear from the outside 4 of the wall into the coupling element comprises a holder 40 in which, in a way corresponding to the holder 7, four optical wave guide plugs 42 with centering pins 42a (FIG. 3) are mounted floating in parallel one next to the other in chambers 43 so as to be axially displaceable counter to the force of the individual helical coil springs 44. The optical wave guide plugs 42 are also so-called multi-fiber ferrules and their forward axial displaceability is limited by the interaction of shoulders 45 with constrictions 46 in their outward openings in the holder 40. The holder 40 is extended at the front to form a collar 48 to such an extent that the sensitive coupling-side end faces 49 of the plug and/or optical wave guides are protected in the illustrated, unplugged state. The rear region of the holder 40 has reciprocal chambers 50 and 51 for individual tensile relief elements 52 and anti-buckling bushes 53 which are each assigned to an optical wave guide band 55 which surrounds a plurality of optical wave guides 54.

Figure 3:
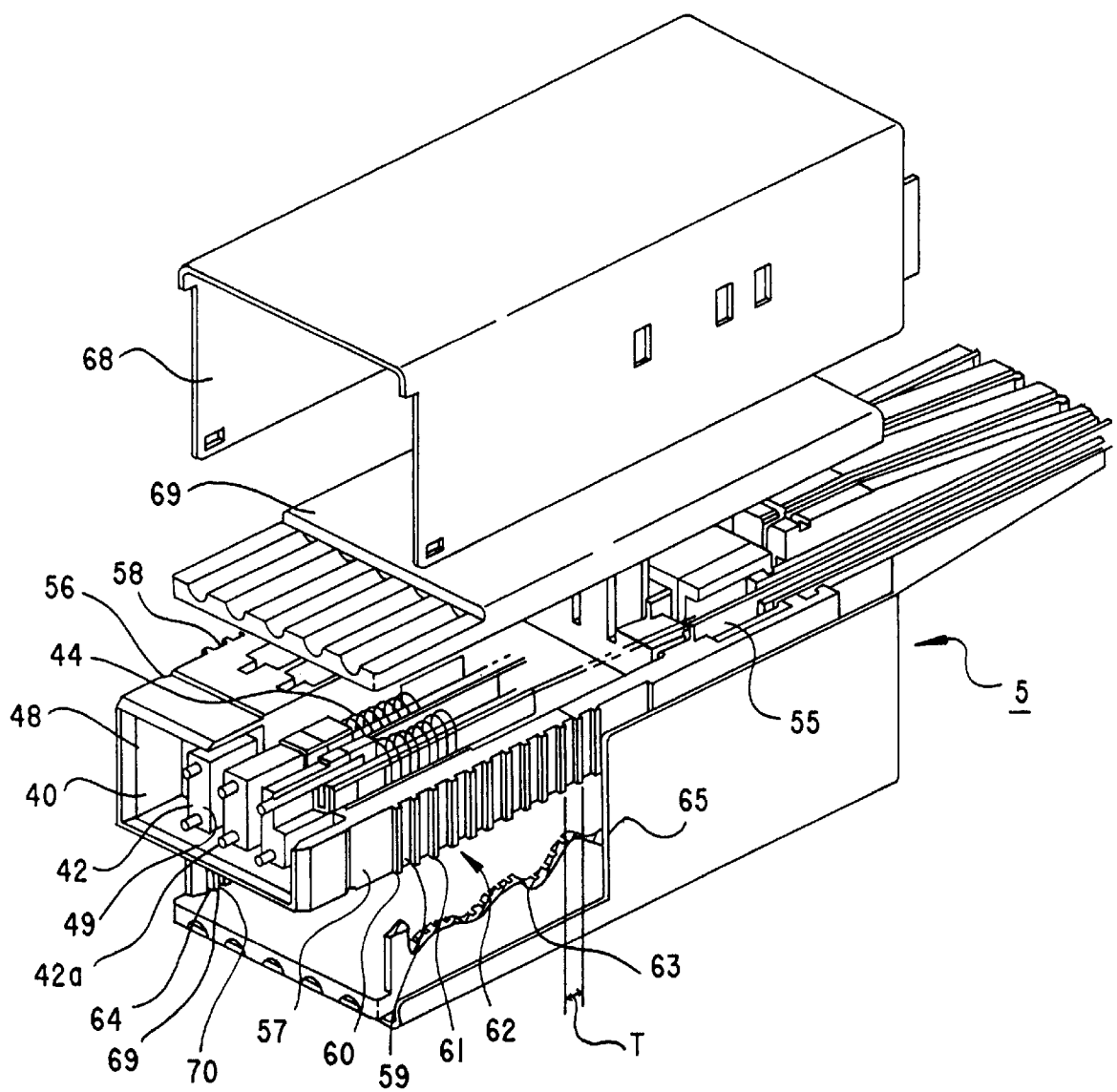
FIG. 3 is a perspective view of the plug connector.

As is shown by FIG. 1 and in the separate, perspective view of the plug connector 5 in FIG. 3, the holder 40 has, on its two side walls 56, 57 an outer contour region 58, 59 which is of a tooth-like design and which is composed essentially of parallel webs 60 and grooves 61 which alternate with a pitch spacing T. By means of this toothing 62 of the holder 40 which is formed in this way on the outside, corresponding internal toothings 63, 64 engage with a toothing 65 of a carrier element 66. The holder 40 is inserted from above into the carrier element 66 through a recess in the cover wall 66a. The carrier element has an approximately U-shaped cross section. The corresponding internal toothings 65 are correspondingly formed by alternating webs 69 and grooves 70 with the same pitch spacing T. Through the interaction of the toothings 62, 65 of holder 40 and carrier element 66, discrete, fixed axial positions of the holder 40 relative to the carrier element 60 can be selected. In order to set a desired degree of projection of the front-end region of the holder 40 beyond the carrier element 66, and thus the optical wave guide plugs 42, which group projection is matched to a thickness d of the wall 2 and to the plug-in depth of the optical wave guide plugs 9 which is still required in view of the plug-in depth of the plugs 9, the holder 40 can be removed vertically from above from the carrier element 66 in accordance with the view in FIG. 2, can be offset in the axial direction A by a desired number of pitch spacings T of the toothings and can be lowered back again into the carrier element 66 in order to secure it axially in the direction of the web 60. In addition, FIGS. 2 and 3 also show a cover 68 which closes off the interior of the holder 40 after assembly and which, itself, is surrounded by a U-shaped electric shield 69.

Referring specifically to FIG. 2, the carrier element 66 has lateral locking projections 80, 81 which interact with openings 83, 84 in locking levers 85, 86 which can undergo spring extension in an outward direction. When the plug connector 5 is inserted, the locking projections 80, 81 latch into the openings 83, 84 and thus prevent undesired withdrawal of the plug connector 5 from the coupling element 28. These locking means cause the carrier element 66 to be secured in position relative to the coupling element 28 and the wall 2, with the result that the adjustment possibility described above allows the plug-in depth e of the holder 40 and/or of the optical wave guide plugs 42 with respect to the locking point between the locking means 80, 81 and 83, 84 to be adjusted individually to the thickness d of the wall 2. The described wall bushing can therefore be adjusted extremely simply to different desired plug-in depths with a uniform structural configuration of the central components and with unchanged maximum spring travel or unchanged spring forces, in which case it is unnecessary to adapt the interacting plug connector 3.

We claim:

1. Optical plug connector for insertion into a coupling element and optical alignment of an optical wave guide plug, comprising:

a holder having an optical wave guide plug axially displaceably mounted therein;

a carrier element receiving and housing said holder, said carrier element having elements for fixing a position of said carrier element relative to a coupling element into which the optical plug connector is insertible; and said holder and said carrier element each having positively engaging contours for defining and securing said holder relative to said carrier element in an axial direction at least at two different discrete positions on said holder and said carrier element.

2. The plug connector according to claim 1, which further comprises a spring element axially biasing said optical wave guide plug within said holder.

3. The plug connector according to claim 1, wherein said carrier element is formed with an opening in a wall thereof, and said holder is insertible into said carrier element through said opening.

4. The plug connector according to claim 1, wherein said positively engaging contours include an external toothing with a given pitch spacing formed on said holder and a mating internal toothing with the given pitch spacing formed on said carrier element.

5. The plug connector according to claim 1, wherein the optical wave guide plug is one of a plurality of wave guide plugs, and said holder is formed with a plurality of chambers each containing a respective said optical wave guide plug in a floating spring-loaded position.

6. The plug connector according to claim 5, wherein each of said optical wave guide plugs terminates a plurality of optical wave guides.

7. The plug connector according to claim 5, wherein said holder is formed with a collar at a forward end thereof in a plug-in direction, said collar projecting beyond end faces of said optical wave guide plugs.

8. The plug connector according to claim 1, wherein said holder is formed with a collar at a forward end thereof in a plug-in direction, said collar projecting beyond an end face of said optical wave guide plug.

9. The plug connector according to claim 1, wherein said holder is formed with receptacle chambers at a rear thereof relative to a plug-in direction, and including tensile relief elements having ends received in said receptacle chambers.

10. The plug connector according to claim 1, wherein said holder is formed with receptacle chambers at a rear thereof relative to a plug-in direction, and including anti-buckling elements having ends received in said receptacle chambers.

11. The plug connector according to claim 1, wherein said holder is formed with receptacle chambers at a rear thereof relative to a plug-in direction, and including tensile relief elements and anti-buckling elements received in said receptacle chambers.

\* \* \* \* \*